United States Patent
DeVane (10) Patent No.: US 10,463,054 B2
(45) Date of Patent: Nov. 5, 2019

(54) METHODS OF TEA EXTRACTION

(71) Applicant: Teaspressa, LLC, Goodyear, AZ (US)

(72) Inventor: Allison DeVane, Goodyear, AZ (US)

(73) Assignee: Teaspressa LLC, Tempe, AZ (US)

( * ) Notice: Subject to any disclaimer, the term of this patent is extended or adjusted under 35 U.S.C. 154(b) by 380 days.

(21) Appl. No.: 15/160,733

(22) Filed: May 20, 2016

(65) Prior Publication Data

US 2016/0338375 A1 Nov. 24, 2016

Related U.S. Application Data (60) Provisional application No. 62/164,442, filed on May 20, 2015.

(51) Int. Cl.
*A23F 3/18* (2006.01)

(52) U.S. Cl.
CPC .................... *A23F 3/18* (2013.01)

(58) Field of Classification Search
CPC ........................................................ A23F 3/18
See application file for complete search history.

(56) References Cited

U.S. PATENT DOCUMENTS

| | | | | |
|---|---|---|---|---|
| 4,668,525 A * | 5/1987 | Creswick | ................. | A23F 3/18 426/435 |
| 6,220,147 B1 * | 4/2001 | Priley | ................. | A47J 31/0615 99/299 |
| 9,364,117 B2 | 6/2016 | Prefontaine | | |
| 9,433,318 B2 | 9/2016 | Prefontaine et al. | | |
| 2002/0170438 A1 * | 11/2002 | Liu | ................. | A47J 31/0615 99/293 |
| 2005/0084544 A1 * | 4/2005 | Ekanayake | ............ | C07C 231/22 424/725 |
| 2007/0264390 A1 * | 11/2007 | Pretorius | ................. | A23F 3/34 426/49 |
| 2008/0038441 A1 * | 2/2008 | Kirschner | ................. | A23F 5/18 426/594 |
| 2010/0034942 A1 * | 2/2010 | Illy | ................. | A47J 31/002 426/433 |
| 2010/0272857 A1 * | 10/2010 | Nagao | ................. | A23F 3/163 426/52 |
| 2013/0156930 A1 * | 6/2013 | Sasame | ................. | A23F 3/163 426/597 |
| 2013/0177672 A1 * | 7/2013 | Robinson | ................. | A23F 3/30 426/72 |
| 2014/0147560 A1 * | 5/2014 | Radhakrishnan | ... | A47J 31/3614 426/231 |
| 2016/0022087 A1 * | 1/2016 | Han | ................. | A47J 31/56 426/435 |
| 2016/0235240 A1 | 8/2016 | Prefontaine et al. | | |
| 2017/0000284 A1 | 1/2017 | Prefontaine et al. | | |

FOREIGN PATENT DOCUMENTS

CN 102302068 * 1/2012

OTHER PUBLICATIONS

English Translation for CN 102302068 published Jan. 2012.*

* cited by examiner

*Primary Examiner* — Anthony J Weier
(74) *Attorney, Agent, or Firm* — KW Law, LLP (57) ABSTRACT

A tea extraction method including performing a multistage pressure extraction process. Each extraction stage involves forcing a volume of water through a bed of tea material held in a tea material receiver. Each extraction stage may be performed at an extraction stage pressure and a water temperature. Each extraction stage may be separated by a soak stage.

9 Claims, 5 Drawing Sheets

METHODS OF TEA EXTRACTION

CROSS REFERENCE TO RELATED APPLICATION

This application claims the benefit of and priority to U.S. Ser. No. 62/164,442, entitled "Methods of Tea Extraction," filed on May 20, 2015. The entire disclosure of the aforementioned application is incorporated herein by reference for any purpose.

FIELD

The present disclosure relates to methods for producing tea-based beverages. In particular, the disclosure relates to methods of producing concentrated tea extracts for tea-based beverages.

BACKGROUND

Tea and tea beverages are traditionally produced by steeping loose tea or tea contained in tea bags in hot water for a period of time to extract flavor and aroma compounds from the tea particles. These traditional steeping-type tea brewing methods have been used with little variation or improvement for thousands of years. While the use of different water temperatures and steeping times for different types of tea are generally recognized and known to produce tea liquors (i.e., the liquid produced by steeping tea leaves or particles) with different flavor profiles due to differential extraction of flavor and aroma compounds, steeping may generally fail to extract tea constituents that could contribute to tea-based beverages with novel and desirable characteristics. Thus, improved methods of tea extraction are desirable.

SUMMARY

In various embodiments, a tea extraction method may comprise one or more extraction stages. Each extraction stage may comprise forcing a volume of water into a bed of tea material. An extraction stage may be performed at an extraction stage pressure above ambient pressure. An extraction stage pressure may be above about 8 bar, such as an extraction stage pressure of about 9 bar, or an extraction stage pressure may be below about 8 bar, such as between about 2 bar and about 7 bar. An extraction stage may be performed using a volume of water at a water temperature, and an extraction stage may have an extraction stage duration. A tea extraction method may comprise a multistage pressure extraction process comprising a plurality of discontinuous pressure extraction stages. Each extraction stage may be separated by a soak stage having a soak stage duration. A tea extraction method may comprise a plurality of extraction stages and a plurality of soak stages. In various embodiments, a first extraction stage may be separated from a second extraction stage by a change in extraction stage pressure. The tea liquor produced during one or more extraction stages may be collected to provide a total volume of tea liquor.

In various embodiments, a tea extraction method may comprise placing an amount of tea material in a tea material receiver to produce a bed of tea material. The tea material may be compressed into the tea material receiver to produce a compressed bed of tea material. A tea extraction method may comprise forcing a volume of water through the bed of tea material. A particle size of the tea material may be reduced prior to placing the tea material in the tea material receiver. The amount of tea material used for a tea extraction method, the temperature of the water, the particle size, and the duration of an extraction stage and/or a soak stage may be selected in response to the variety of tea used for an extraction method.

A tea liquor produced using a tea extraction method in accordance with various embodiments may have a refractometric dry substance measurement that is greater than that of a tea liquor produced using a steeping-type brewing method or a single stage pressuring brewing method. A tea liquor produced using a method in accordance with various embodiments may have a refractometric dry substance measurement value greater than about 2.0° Bx, or greater than about 1.0° Bx, or greater than about 0.9° Bx, or greater than about 0.8° Bx, or greater than about 0.7° Bx, or greater than about 0.6° Bx, or greater than about 0.5° Bx.

The foregoing features and elements may be combined in various combinations without exclusivity, unless expressly indicated herein otherwise. These features and elements as well as the operation of the undisclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "tea material" means any plant material that may be extracted with water by using various methods to produce a tea or tea-like beverage. "Tea material" can include plant material from *Camillia sinensis* as well as other plant materials, such as materials that may also be referred to as "tisanes," "herbal teas," or "botanicals," including, for example, chamomile, mint, rooibos and the like. As used herein, "tea material" can include blends of plant materials, such as a blend of plant material from *Camillia sinensis* with plant material derived from another plant species.

As used herein, the term "tea liquor" means an aqueous extract of a tea material. As used herein, the terms "tea," "tea beverage," and "tea-like beverage" may all comprise a "tea liquor" extracted from a "tea material," as these latter terms are defined herein.

As used herein, the term "refractometric dried substance" (RDS) means the total dissolved solids and/or the total suspended solids in a solution such as a tea liquor. The RDS of a solution may be estimated or measured using a refractometer and expressed in Brix units (° Bx).

In various aspects, a tea extraction method can comprise placing tea material in a tea material receiver and forcing water through the tea material at a pressure above ambient pressure. In various embodiments, a multistage pressure extraction method can comprise a series of discontinuous pressure extraction stages performed at a relatively high extraction stage pressure, for example, greater than about 8 bar, with two or more extraction stages separated by an intervening soak stage. In various embodiments, a tea extraction method can comprise extraction stages performed with an extraction stage pressure between about 8 bar and about 12 bar. For example, a tea extraction method can be performed with an extraction stage pressure of about 9 bar. In various embodiments, a tea extraction method can comprise an extraction stage performed at a relatively low pressure, such as between about 2 bar and about 7 bar, or between about 2 bar and about 5 bar, and the like. A tea liquor produced using the various methods disclosed herein may comprise a higher level of total dissolved solids and/or total suspended solids in comparison to a tea liquor produced from an equal quantity of the same tea, having the same particle size, extracted by a traditional steeping method in an equal volume of water of the same temperature for the same period of time or for a longer period of time typically used for steeping, such as about 4-5 minutes.

Figure 1:
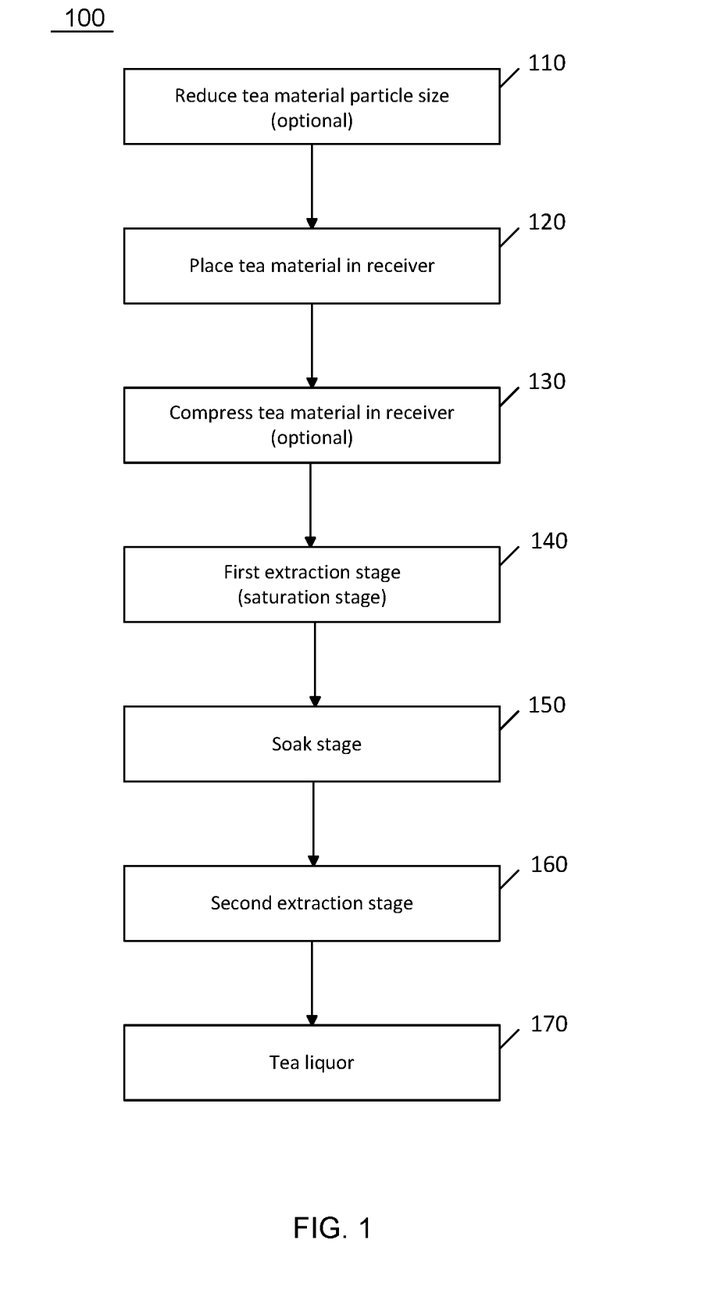
FIG. 1 illustrates a process flow for a tea extraction method in accordance with various embodiments.

With reference to FIG. 1, a tea extraction method 100 is illustrated. In accordance with various embodiments, tea extraction method 100 comprises preparation of tea material for extraction. Preparation of tea material for extraction can optionally comprise reducing a particle size of the tea material (step 110). A measured amount of tea material may then be placed in a tea material receiver (step 120). The tea material may optionally be compressed into the tea material receiver (step 130). Following preparation of the tea material, tea extraction method 100 may further comprise a series of extraction steps. For example, tea extraction method 100 can comprise a first extraction stage (step 140), a soak stage (step 150), and a second extraction stage (step 160). The output of tea extraction method 100, and in particular the output of first extraction stage (step 140) and/or second extraction stage (step 160) and any subsequent extraction stages, may be collected as tea liquor 170.

In various embodiments, a tea extraction method such as method 100 and preparation of tea material for extraction can comprise reducing a particle size of the tea material (step 110). Tea material can comprise various types of tea derived from *Camillia sinensis* and/or herbal tea plant material. Tea material generally comprises dried plant and may have a course and irregular particle size that may result from tea production processes, such as whole leaf material, broken leaf material rolled or compressed leaf material, and the like. For example, various types of tea material that may be used in tea extraction method 100 can include teas such as black tea, green tea, oolong tea, white tea, yellow tea, Pouchong tea, pu-erh tea, and blended teas, to name several. Likewise, any of a variety of herbal tea materials derived from plants other than *Camillia sinensis* may be used in tea extraction method 100, such as rooibos, yerba mate, mint, lemongrass, lemon balm, French verbena, chamomile, rose, hibiscus, lavender, cinnamon, slippery elm bark, black cherry bark, ginger, Echinacea root, chicory root, raspberry, blueberry, peach, apple, cardamom, caraway, and fennel, to name several. In various embodiments, the particle size of a tea material may be reduced in step 110, such as by grinding in a blade grinder, burr grinder, or the like.

In various embodiments, the particle size of a tea material may be reduced in step 110 to a size that is selected in response to the type of tea to be extracted in method 100. For example, rooibos material particle size may be reduced to a particle size of between about 100 μm and about 500 μm. Black tea material particle size may be reduced to a particle size of between about 600 μm and about 900 μm. Green tea material particle size may be reduced to a particle size of between about 900 μm and about 1500 μm. Tea blends such as Earl Grey blend may be reduced to a particle size of between about 500 and about 700 μm. The particle size of a tea material may be the nominal size of the particles of the tea material, with greater than about 60%, or greater than about 70%, or greater than about 80%, or greater than about 90% of the particles in a tea material falling within the target particle size range for the reduced particle size. In various embodiments, reducing a particle size of a tea material (step 110) is optional, and a tea material particle size need not be reduced as part of extraction method 100 or the various other extraction methods described herein.

In various embodiments, tea extraction method 100 may comprise placing an amount of tea material in a tea material receiver (step 120) to produce a bed of tea material. An amount of a tea material may be measured by volume or by mass. For example, in various embodiments, an amount of tea material placed in a tea material receiver may be between about 4 g and about 15 g. In various embodiments, an about of tea material placed in a tea material receiver may be between about 4 g and about 8 g. Placing an amount of tea material can comprise measuring tea material in a loose form into a multi-use, durable tea material receiver, in contrast to placing an amount of tea material previously packaged in a single use container as a predetermined tea serving. In various embodiments, an amount of tea material used in a tea extraction method may be selected in response to the type of tea material. The amount of tea material used for a brewing method may vary in response to the type of tea, the quantity of tea liquor desired, the strength of the tea liquor desired, the particle size of the tea, the temperature of the water to be used for extraction, and the like. Any suitable amount of tea material may be used in accordance with the methods of the present disclosure. In various embodiments, tea extraction method 100 can optionally further comprise compressing the tea material into the tea material receiver, as described below; however, compression of the tea material into the tea material receiver is not required in accordance with various embodiments.

A tea material receiver may comprise device, such as a portafilter or similar device, configured to receive an amount of tea material and be attached to an extraction instrument. A tea material receiver may be a durable, reusable device. An extraction instrument may comprise an espresso machine or similar instrument configured with a heater and a pump to deliver heated water through a bed of tea material in the tea material receiver at a pressure above ambient or atmospheric pressure. A tea material receiver may comprise a filter basket with an attached handle. The filter basket of the tea material receiver may be sealably attached to a grouphead of the extraction instrument configured to distribute pressurized water from the instrument over the bed of tea material in the tea material receiver, forcing water to flow through the tea in the tea material receiver. The tea liquor that emerges from the bed of tea material can flow out of an outlet in the tea material receiver to be collected in a collection device. In accordance with various embodiments, an instrument can be configured to perform various steps of a multistage pressure extraction method, such as the methods described in greater detail below, on an automated or semi-automated basis. For example, an instrument could be configured to deliver specific volumes of water at specific temperatures, pressures, and intervals that may be specified in accordance with the various methods described herein based on input from an operator with respect to the type and amount of tea material to be extracted.

In various embodiments, tea extraction method 100 may optionally comprise compressing the bed of tea material into the tea material receiver (step 130). Compressing the bed of tea material into the tea material receiver may produce a compressed bed of tea material. A tamp may be used to provide compression force that is evenly distributed over the bed of tea material in a tea material receiver. The tamp may have a round end with a flattened surface configured to be received by the tea material receiver. The tamp may be pressed into tea material contained in the tea material receiver with an amount of force suitable to produce a compressed bed of tea material with a substantially even level of tea material compaction throughout the bed.

Following production of a bed of tea material in step 120 or a compressed bed of tea material in the tea material receiver in step 130, the tea material receiver may be attached to an extraction instrument.

Following preparation of the tea material for extraction, a multistage pressure extraction may comprise a plurality of discontinuous pressure extraction stages. For example, tea extraction method 100 may comprise a first extraction stage (step 140) and a second extraction stage (step 160). Each extraction stage may comprise forcing a volume of water into the bed of tea material (or the compressed bed of tea material) at an extraction stage pressure. Each extraction stage may be performed using a volume of water having a water temperature, and each extraction stage may have an extraction stage duration. The first extraction stage and the second extraction stage may be separated by a soak stage (step 150) having a soak stage duration. The volume of water forced through the bed of tea material during the extraction stages may be collected in a collection device as tea liquor 170.

In various embodiments, a first extraction stage (step 140) can comprise forcing a first volume of water into the bed of tea material. In various embodiments, the volume of water used in the first extraction stage and/or the duration of the stage may be configured to force water into the bed of tea material in the tea material receiver until the bed of tea material is wet and/or the first portion of tea liquor just flows out of the tea material receiver outlet, thereby producing a saturated bed of tea material. In various embodiments, first extraction stage (step 140) may be discontinued when tea liquor is observed at the tea material receiver outlet, or after a predetermined first volume of water configured (i.e. calculated) to wet the bed of tea material is pumped by the extraction instrument, or after a predetermined period of time configured to wet the bed of tea material has elapsed (i.e., the extraction stage duration). Stated differently, in various embodiments, the first volume of water may be modulated to substantially wet the bed of tea material without displacing water or tea liquor from the tea material receiver outlet. For purposes of the present disclosure, a first extraction stage to produce a substantially wet or saturated bed of tea material may also be referred to as a "saturation stage." In various embodiments, discontinuation of the first extraction stage may comprise initiation of a subsequent soak stage (step 150).

The extraction stage pressure of an extraction stage can be the pressure of the water emitted by a grouphead into a bed of tea material. In various embodiments, the extraction stage pressure of the first extraction stage and/or the second extraction stage of method 100 may be greater than about 8 bar, for example, between about 9 bar and about 12 bar. In various other embodiments and as described in greater detail below with reference to FIG. 3, the extraction stage pressure of an extraction stage may be lower than 8 bar, such as between about 2 bar and about 7 bar, or between about 2 bar and about 5 bar.

In various embodiments, an extraction stage of method 100 may be performed using water having a water temperature. The water temperature may be between about 77° C. (170° F.) and about 99° C. (210° F.). In various embodiments, the water temperature used for the extraction stages of an extraction method may be selected in response to the type of tea being extracted. For example, in various embodiments, a water temperature of about 200° F. may be selected for extraction of a black tea material or an oolong tea material. A water temperature of about 175° F. may be selected for extraction of a green tea material or a white tea material. Similarly, in various embodiments, the water temperature of an extraction stage may be selected based on the type of tea material being extracted and the particle size of the tea material.

With continued reference to FIG. 1, upon completion of the first extraction stage (step 140), tea extraction method 100 may further comprise a soak stage (step 150). The soak stage may have a soak stage duration. The soak stage may produce a soaked bed of tea material. In various embodiments, the soak stage duration may be selected in response to the type of tea being extracted. For example, a soak stage duration of about 5 second to about 20 seconds, or about 7 seconds to about 16 seconds, or about 9 seconds to about 11 seconds, or about 10 seconds, may be used for a black tea material or an herbal tea material. In various embodiments, a soak stage duration of about 3 seconds to about 10 seconds, or about 4 seconds to about 6 seconds, or about 5 seconds, may be used for a green tea material or a white tea material. Various combinations of tea types and soak stage durations may be used for a tea extraction method in accordance with various embodiments of the present disclosure.

Following the soak stage (step 150), tea extraction method 100 may further comprise a second extraction stage (step 160). Similar to the first extraction stage (step 140), a second extraction stage can comprise forcing a second volume of water into the saturated bed of tea material. The volume of water forced into the soaked bed of tea material in the second extraction stage may displace a volume of tea liquor from the soaked bed of tea material. The tea liquor may exit the bed of tea material via an outlet in the tea material receiver and be collected in a collection device. The second extraction stage may have a second extraction stage duration, and the water may have a water temperature. In various embodiments, the water temperature used for the second extraction stage may be approximately the same as that used for the first extraction stage, or the water temperature for the second stage may be different from that of the first extraction stage. In various embodiments, the second extraction stage may be discontinued when a predetermined second volume of water has been forced through the saturated bed of tea material, or when a volume of tea liquor has been recovered, or after a predetermined period of time has elapsed. In various embodiments, the duration of the second extraction stage may be selected in response to the type of tea being extracted. For example, a second extraction stage may have a duration of about 15 second to about 25 seconds for a black tea material or an herbal tea material. A second extraction stage may have a duration of about 7 seconds to about 13 seconds for a green tea material or a white tea material. In various other embodiments, the second extraction stage may continue until a desired tea liquor volume has been produced, such as a volume of about 4 ounces to about 14 ounces. In various embodiments, the desired volume of tea liquor may vary proportionately to the amount of tea material used for the extraction.

In various embodiments, a tea extraction method may comprise a plurality of extraction stages and a plurality of soak stages. For example and with reference now to FIG. 2, a tea extraction method 200 may comprise three extraction stages and two soak stages. A tea extraction method may likewise comprise four, five, or more extraction stages (i.e., n extraction stages), and each extraction stage may be separated by a soak stage (i.e., n–1 soak stages). In various embodiments, tea extraction method 200 can comprise preparing tea materials (step 210). Preparing tea materials (step 210) can comprise various steps described above with reference to FIG. 1, and may include reducing the particle size of a tea material (step 110), placing an amount of tea material in a tea material receiver (step 120) to produce a bed of tea material, and optionally compressing the tea material in the tea material receiver (step 130) to produce a compressed bed of tea material.

Figure 2:
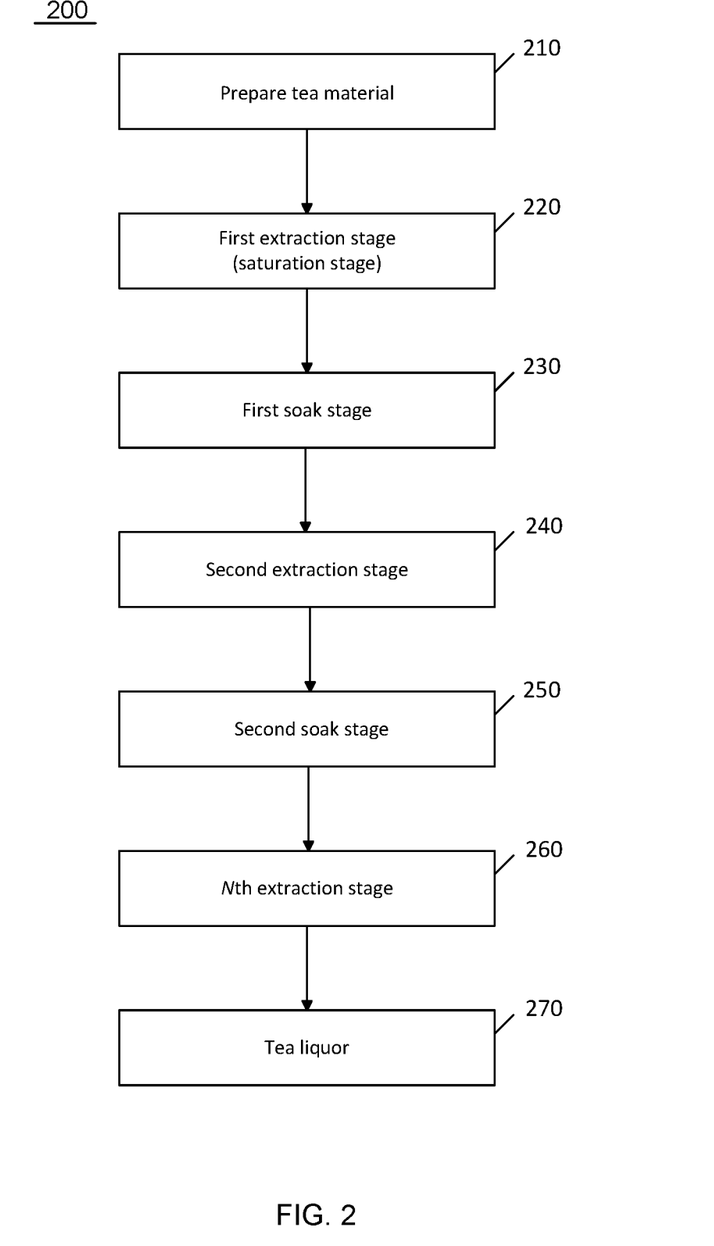
FIG. 2 illustrates a process flow for a tea extraction method in accordance with various embodiments.

Following preparation of the tea material in step 210, tea extraction method 200 may comprise a first extraction stage (step 220). The first extraction stage of method 200 may be similar to that described above with reference to FIG. 1 and step 140 of tea extraction method 100. As described above with respect to step 140, the first extraction stage (step 220) of method 200 may also be referred to as a saturation stage during which the bed of tea material is substantially wet during the extraction stage, but with little to no tea liquor recovered from the tea material receiver outlet. Following step 220, tea extraction method 200 may further comprise a first soak stage (step 230) similar to soak stage 150 of tea extraction method 100.

Following first soak stage (step 230), tea extraction method 200 can comprise a second extraction stage (step 240). The second extraction stage of method 200 may be performed in a manner similar to that described above with respect to second extraction stage 160 of method 100. In various embodiments, the second extraction stage may be discontinued when a predetermined second volume of water has been forced through the saturated bed of tea material, or when a volume of tea liquor has been recovered, or after a predetermined period of time has elapsed.

Upon completion of the second extraction stage (step 240), tea extraction method 200 can comprise a second soak stage (step 250). The second soak stage may be initiated when the second extraction stage is discontinued, and the second soak stage duration may be substantially the same as the first soak stage (step 230) duration, or the second soak stage duration may be different from the first soak stage duration.

In various embodiments, following completion of the second soak stage (step 250), tea extraction method 200 may further comprise a third, fourth, and/or an nth extraction stage (step 260). The nth extraction stage may be performed in a manner similar to that of the first extraction stage (step 220) and the second extraction stage (step 240). In various embodiments, each extraction stage may be separated from the prior extraction stage by a soak stage (i.e., an (n–1)th soak stage). A tea extraction method can include any suitable number of extraction stages and soak stages in accordance with various embodiments of the present disclosure. The output of the extraction stages of tea extraction method 200 may be collected in a collection device as tea liquor 270.

Figure 3:
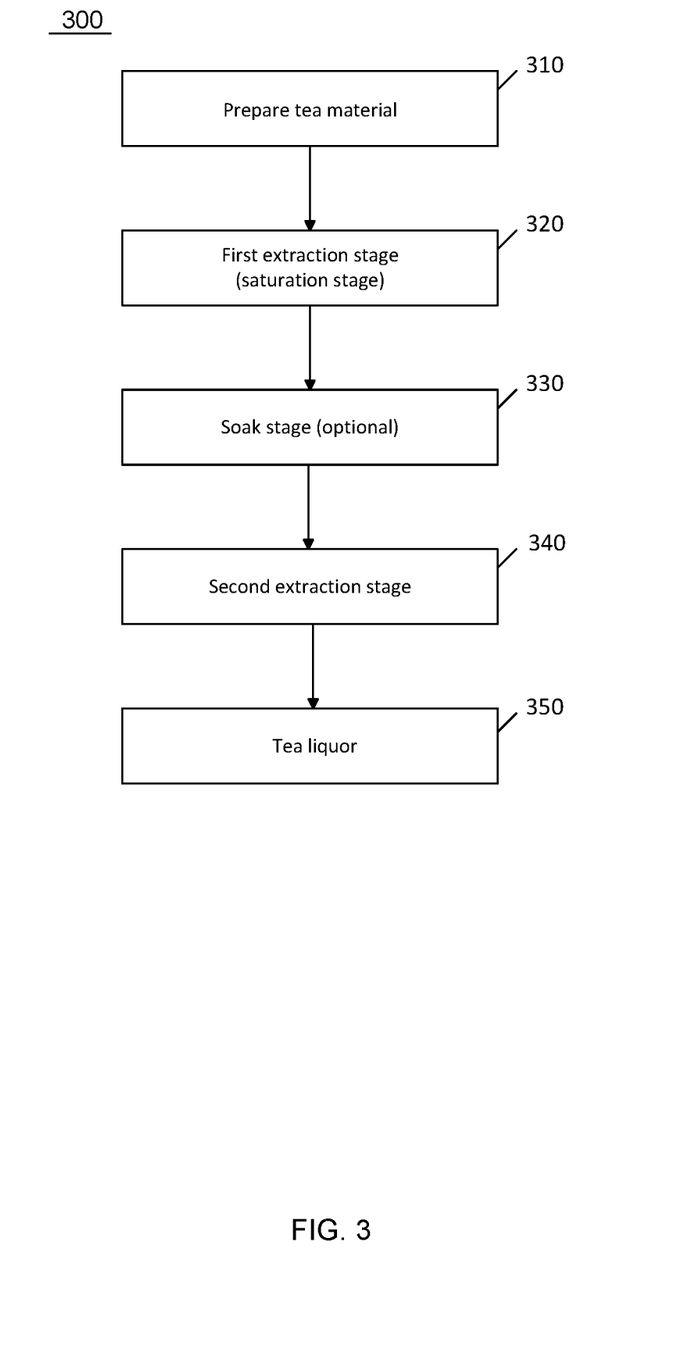
FIG. 3 illustrates a process flow for a tea extraction method in accordance with various embodiments.

Referring now to FIG. 3, a tea extraction method 300 in accordance with various embodiments is illustrated. Tea extraction method 300 may comprise preparing tea materials (step 310), performing a first extraction stage (step 320), optionally performing a soak stage (step 330), performing a second extraction stage (step 340), and collecting tea liquor 350. In various embodiments and as described in greater detail below, the first extraction stage and the second extraction stage may be performed at different extraction stage pressures.

In various embodiments, the step of preparing tea materials (step 310) for tea extraction method 300 may be similar to step 210 described above with respect to tea extraction method 200 (FIG. 2). Following preparation of tea materials in step 310, a first extraction stage (step 320) may be performed. In various embodiments, the first extraction stage may be performed at an extraction stage pressure that is lower than an extraction stage pressure used in a second extraction stage. For example, in various embodiments, a first extraction stage may be performed at a first extraction stage pressure of below about 8 bar, or at an extraction stage pressure of between about 2 bar and about 5 bar, or an extraction stage pressure of between about 3 bar and about 4 bar. In various embodiments, the first extraction stage may be discontinued when a predetermined first volume of water has been forced through the bed of tea material, or when a volume of tea liquor has been recovered, or after a predetermined period of time has elapsed. In various embodiments, the first extraction stage in step 320 may be a saturation stage, with little to no tea liquor recovered, as described above. In various embodiments and as described above, the water temperature and/or the duration of the first extraction stage may be selected in response to the type of tea being extracted.

Following completion of the first extraction stage (step 320), tea extraction method 300 may optionally comprise a soak stage (step 330). A soak stage may be performed in a manner similar to that described above with respect to step 150 of tea extraction method 100 (FIG. 1). In various embodiments, tea extraction method 300 need not comprise a soak stage.

In various embodiments, tea extraction method 300 comprises a second extraction stage (step 340). The second extraction stage may immediately follow the first extraction stage (step 320) or a soak stage (step 330) that may optionally follow the first extraction stage. In various embodiments, the second extraction stage is performed using a second extraction stage pressure that is different from the first extraction stage pressure. In this manner, the first extraction stage and the second extraction stage of tea extraction method 300 are discontinuous (i.e., the first extraction stage at the first extraction stage pressure is discontinued when the second extraction stage at the second extraction stage pressure is initiated). In various embodiments, the second extraction stage may be performed at a second extraction stage pressure above about 8 bar, such as between about 8 bar and about 12 bar. For example, in various embodiments, tea extraction method 300 may comprise a first extraction stage (step 320) performed at a first extraction stage pressure of about 3 bar to about 4 bar and a second extraction stage (step 340) performed at a second extraction stage pressure of about 8 bar to about 9 bar. The second extraction stage may be discontinued when a predetermined second volume of water has been forced through the bed of tea material, or when a volume of tea liquor has been recovered, or after a predetermined period of time has elapsed. The output of the first extraction stage (step 320) and the second extraction stage (step 340) of tea extraction method 300 may be collected in a collection device as tea liquor 350.

In accordance with various embodiments, the plurality of extraction stages of the various multistage tea extraction methods described above may be performed in less than about 90 seconds. Stated another way, the tea liquors produced using the various methods described above are produced with less than about 90 seconds of total contact time, or less than about 75 seconds total contact time, or less than about 60 seconds of total contact time, or less than about 45 seconds of total contact time, or less than about 35 seconds of total contact time between the tea material and water during the extraction process.

In various embodiments, a tea liquor produced using a tea extraction method described above may have a refractometric dry substance measurement value greater than that of a tea produced using an equal quantity of the same tea material (having the same particle size) and a steeping-type brewing method or a continuous extraction stage pressure extraction method using substantially the same volume of water at substantially the same water temperature (i.e., an "equivalent extraction"). The refractometric dry substance measurement may be determined using a refractometer, with the value expressed in Brix (° Bx). The value of the refractometer measurement represents an approximation of the total dissolved solids and/or the total suspended solids in a solution, with higher values indicating greater extraction of soluble components of the tea material. A tea liquor produced using methods in accordance with various embodiments may have a refractometric dry substance measurement value greater than about 1.0° Bx, or greater than about 0.9° Bx, or greater than about 0.8° Bx, or greater than about 0.7° Bx, or greater than about 0.6° Bx, or greater than about 0.5° Bx, while an equivalent extraction using a steeping method with a 5 minute duration may have a refractometric dry substance measurement value less than about 0.5° Bx, or less than about, 0.4° Bx, or less than about 0.3° Bx, or less than about 0.2° Bx. A tea liquor produced using methods in accordance with various embodiments may have a refractometric dry substance measurement value with a range of about 0.5° Bx and about 4.0° Bx, or about 0.8° Bx and about 3.0° Bx, or about 1.0° Bx and about 2.5° Bx. Similarly, in various embodiments, a tea liquor produced using an extraction method comprising a first soak stage and a second soak stage may have a refractometric dry substance measurement value of at least about 3-fold greater, or at least about 2-fold greater, or at least about 1.5-fold greater than the refractometric dry substance measurement value of a tea liquor produced using an equivalent extraction lacking soak stages. Refractometric dry substance measurements for tea liquors produced for various teas extracted using the methods described herein compared to tea liquors produced with other methods are compared in Example 1, below.

In various embodiments, reducing a particle size of a tea material prior to extraction using the various methods described herein increases a refractometric dry substance measurement value of the resultant tea liquor as compared to the refractometric dry substance measurement value of a tea liquor produced for an equivalent extraction performed using tea material with a particle size that has not been reduced.

In various embodiments, the total phenolic content of a tea liquor produced using the methods of the present disclosure may be higher than the total phenolic content of a tea liquor produced for an equivalent extraction using a steep-type brewing method or a non-soak pressure brewing method. The total phenolic content of a tea liquor may be measured using a method such as the Folin-Ciocalteu assay method. Similarly, in various embodiments, a tea liquor produced using the methods of the present disclosure may have a caffeine, L-theanine, total alkaloid content (e.g., for teas derived from *Camillia sinensis*, yerba mate, or other caffeine or alkaloid-containing plant materials), or a total antioxidant capacity, that may be higher than that of an equivalent extraction performed using a steep-type brewing method or a non-soak pressure brewing method. The caffeine, L-theanine, and/or total alkaloid content of a tea liquor may be measured using standard methods, such as high-pressure liquid chromatograph (HPLC), as described in Example 3, below. The total antioxidant capacity of a tea liquor may be measured using techniques such as the 2,2'-azino-bis(3-ethylbenzthiazoline-6-sulfonic acid) (ABTS) radical cation decolorization assay, the Trolox equivalent antioxidant capacity (TEAC) assay, and the ferric ion reducing antioxidant power (FRAP) assay. Likewise, a tea liquor produce using the methods of the present disclosure may have a higher optical density (i.e., absorbance). For example, tea liquors produced for five different tea varieties using the methods of the present disclosure are translucent, with low optical clarity, while tea liquors produced using equivalent extractions of the same varieties using a traditional steeping-type method are transparent with relatively high optical clarity. In various embodiments, the optical density of a tea liquor may be measured using a spectrophotometer or similar device. Without wishing to be bound by theory, the methods of the present disclosure may provide tea liquors with more full-bodied flavor characteristics, including a more complex flavor profile due to a more complete extraction of water soluble tea material components.

EXAMPLE 1

Comparison of Refractometric Dry Substance Measurements for Tea Liquors Produced Using Different Extraction Methods Four tea varieties were extracted using three different extraction methods. The first extraction method was a steeping-type method using steep times of 1 min for the "Green Gold" tea variety (a green tea), 3 min for the "Manhattan Black" and the "Charles Grey" tea varieties (black teas), and 6 min for the "Cape Town" tea variety (a rooibos tea). The second method was performed using an espresso machine and a continuous pressure extraction without a soak stage. The third method was the method described above with reference to FIG. 2 comprising four extraction stages separated by three soak stages, also referred to as the "Teaspresso" method. For each extraction, a quantity of about 9 g of tea material was used to produce a 4 oz tea liquor, with the exception of the "Cape Town" tea variety, for which about 18 g of tea material was used. The water temperature for all extractions was between about 202° F. and about 210° F. Following extraction, the tea liquors were allowed to cool to ambient temperature and refractometric dry substance measurements were taken using a Milwaukee MA871 Digital Refractometer (Milwaukee Instruments, Inc., Rocky Mount, N.C.). The refractometric dry substance measurement values of the tea liquors produced for each variety using each brewing method are shown below in Table 1.

TABLE 1

Comparison of refractometric dry substance measurement values (°Bx) of the tea liquors produced using three different extraction methods.

| Tea variety | Teaspresso method | Pressure extraction method without soak | Steeping method |
|---|---|---|---|
| Manhattan Black | 2.0 | 0.8 | 0.0 |
| Charles Grey | 1.7 | 0.5 | 0.0 |
| Green Gold | 2.6 | 0.5 | 0.0 |
| Cape Town | 1.4 | 0.5 | 0.0 |

The Teaspresso method produced refractometric dry substance measurement values 2-fold to 5-fold higher than for the continuous pressure extraction method lacking a soak stage. The tea liquors produced using the traditional steeping type method did not provide measurable values using the refractometer.

EXAMPLE 2

Comparison of Refractometric Dry Substance Measurements for Tea Liquors Produced Using Whole Leaf Tea Material Compared to Reduced Particle Size Tea Material Tea liquors were produced using two different extraction methods for both whole leaf tea material and reduced particle size tea material. All extracts were produced using a proprietary "Manhattan Black" black tea blend (Teaspressa, Phoenix, Ariz.) as the tea material. For the reduced particle size tea material, whole leaf tea material was ground to particle size of about 750 µm average nominal size. All tea extracts were produced using about 9 grams of tea material and about 118 ml of water, with the exception of Sample 6, for which about 177 ml of water was used. Tea extracts were produced using the six different extraction methods described below. Pressure extraction stages were performed using water at a temperature of about 99° C. and a pressure of about 9 bar.

Sample 1: Whole leaf tea extracted using a multistage pressure extraction method with four extraction stages (including the initial saturation stage) separated by three 15 second soak stages producing a total extract volume of about 118 ml.

Sample 2: Whole leaf tea extracted using a single stage pressure extraction with a single extraction stage (with no initial saturation stage and no soak stage) having a duration sufficient to produce about 118 ml of extract.

Sample 3: Reduced particle size tea material extracted using a multistage pressure extraction method with four extraction stages (including the initial saturation stage) separated by three 15 second soak stages producing a total extract volume of about 118 ml.

Sample 4: Reduced particle size tea material extracted using a single stage pressure extraction with a single extraction stage (with no initial saturation stage and no soak stage) having a duration sufficient to produce about 118 ml of extract.

TABLE 2

Comparison of refractometric dry substance (RDS) measurement values (°Bx) of the tea liquors produced using whole leaf tea material and reduced particle size tea material.

| Sample ID | RDS (duplicate measurements) |
|---|---|
| Sample 1 | 0.8 |
|  | 0.8 |
| Sample 2 | 0.7 |
|  | 0.6 |
| Sample 3 | 2.2 |
|  | 2.2 |
| Sample 4 | 1.9 |
|  | 1.8 |

Tea liquors produced using reduced particle size tea material (Sample 3 and Sample 4) had RDS measurement values greater than two-fold higher than those produced using the same extraction method but whole leaf tea material (Sample 1 and Sample 2). Additionally, tea liquors produced using the multistage pressure extraction method (Sample 1 and Sample 3) had higher RDS measurement values than tea liquors produced using a single stage pressure extraction method.

EXAMPLE 3

Quantitative Analysis of Caffeine and L-Theanine in Tea Liquors Produced Using Different Tea Extraction Methods Tea extracts were produced using six different extraction methods. All extracts were produced using a proprietary "Manhattan Black" black tea blend (Teaspressa, Phoenix, Ariz.) as the tea material. All tea material was ground to a reduced tea material particle size of about 750 µm average nominal size. All tea extracts were produced using about 6 grams of tea material and about 118 ml of water, with the exception of Sample 6, for which about 177 ml of water was used. Tea extracts were produced using the six different extraction methods described below. Pressure extraction stages were performed using water at a temperature of about 99° C. and a pressure of about 9 bar.

Sample 1: Standard infusion method, with tea passively infused by placing a tea bag in an about 118 ml volume of water with an initial water temperature of about 99° C. for about 5 minutes.

Sample 2: Multistage pressure extraction method with three extraction stages separated by two 10 second soak stages producing a total extract volume of about 118 ml.

Sample 3: Multistage pressure extraction method with four extraction stages (including the initial saturation stage) separated by three 15 second soak stages producing a total extract volume of about 118 ml.

Sample 4: Multistage pressure extraction method with four extraction stages (including the initial saturation stage) separated by three 10 second soak stages producing a total extract volume of about 118 ml.

Sample 5: Multistage pressure extraction method with six extraction stages (including the initial saturation stage) separated by five 10 second soak stages producing a total extract volume of about 177 ml.

Sample 6: Single stage pressure extraction with a single extraction stage (with no initial saturation stage and no soak stage) having a duration sufficient to produce about 118 ml of extract.

Figure 4:
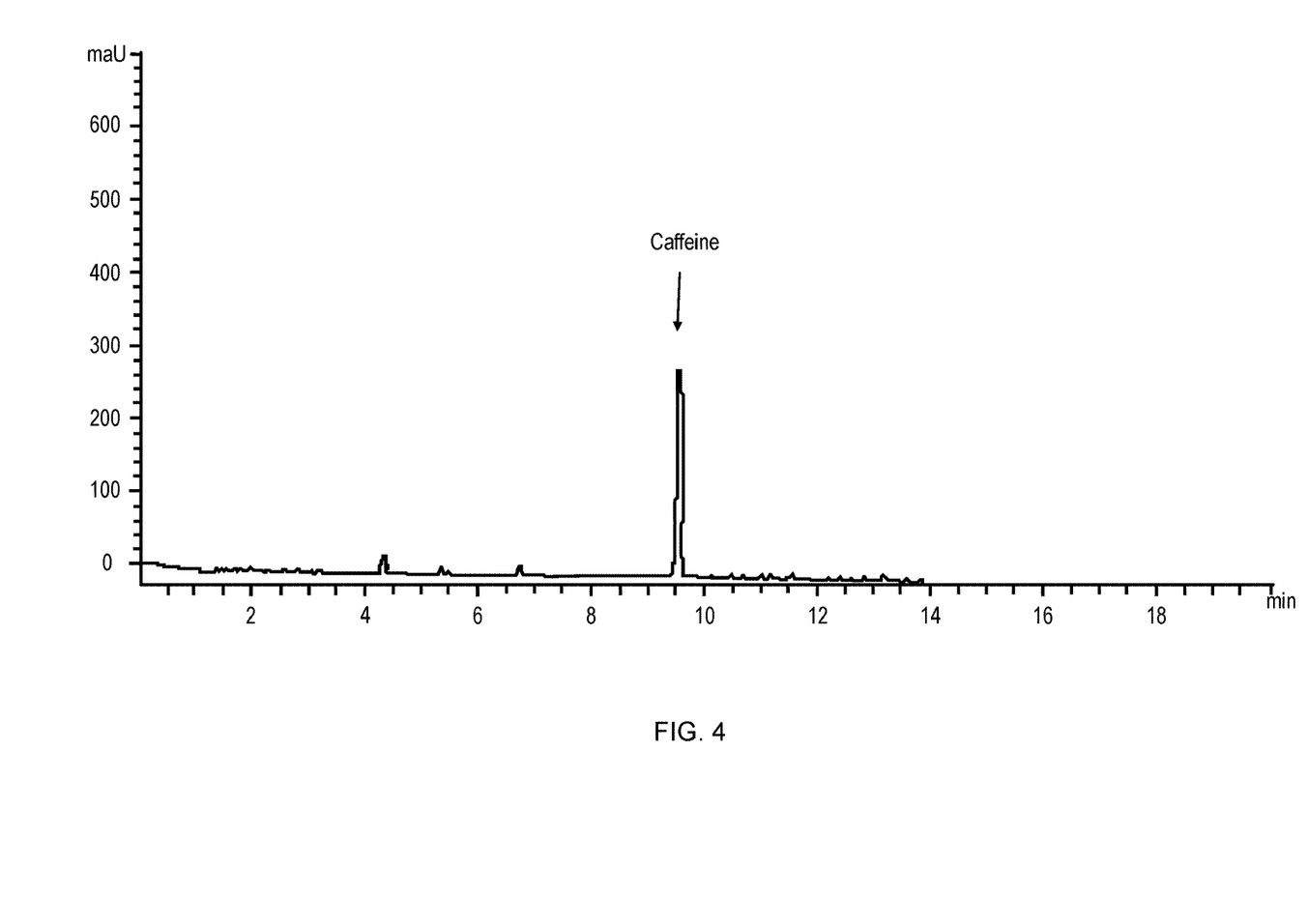
FIG. 4 illustrates a chromatogram from an HPLC caffeine analysis for a tea extract produced using a tea extraction method in accordance with various embodiments.
Figure 5:
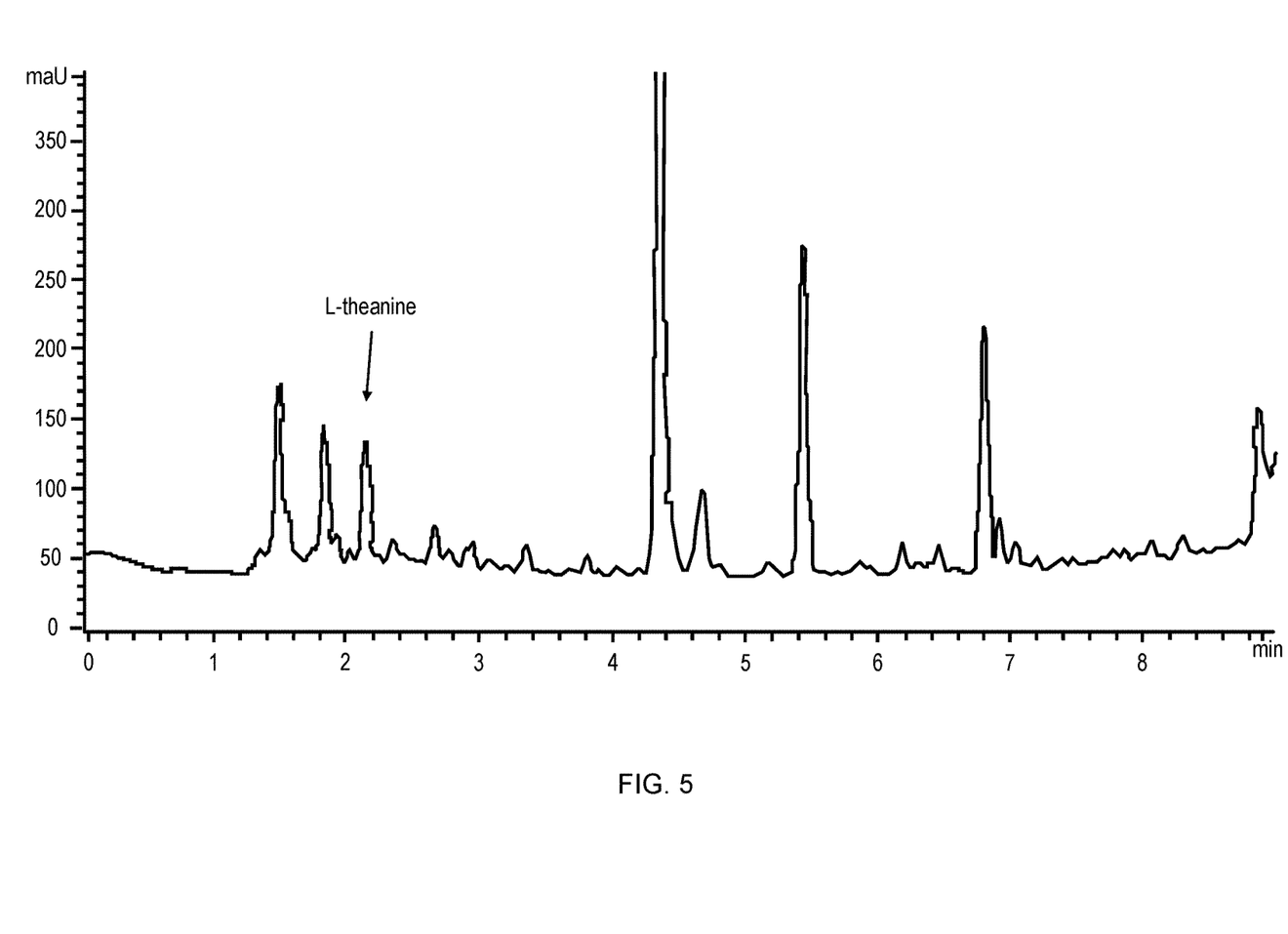
FIG. 5. illustrates a chromatogram from an HPLC L-theanine analysis for a tea extract produced using a tea extraction method in accordance with various embodiments.

Tea extract analysis was performed using an Agilent 1200 Series RRLC system (Agilent Technologies, Santa Clara, Calif.) and a Kinetex C18, 2.6 µm, 150×4.6 mm column (Phenomenex, Torrence Calif.) with gradient elution. For caffeine analysis, tea extract samples were diluted 10-fold with Milli-Q water, and caffeine content was quantified by reversed phase HPLC with UV detection at 275 nm. For L-theanine analysis, tea extract samples were injected without dilution and quantified by reversed phase HPLC with UV detection at 210 nm. Caffeine (C1778, Sigma-Aldrich, St. Louis, Mo.) and L-theanine (T1289, Spectrum Chemical, New Brunswick, N.J.) reference standards were used to prepare calibration standards for quantitative analysis. All quantitative analysis procedures were performed by GAAS Analytical Services (Tucson, Ariz.) according to documented standard operating procedures. Representative chromatograms for caffeine and L-theanine HPLC analysis of Sample 4 are illustrated in FIG. 4 and FIG. 5, respectively. Quantitative data for each of the samples is shown in Tables 3 and 4, below.

TABLE 3

Caffeine content of tea extracts produced using six different extraction methods, as determined by quantitative HPLC analysis.

| Sample ID | AUC (mAUCs) | Caffeine concentration/ run (µg/ml) | Average caffeine concentration (µg/ml) | Total caffeine in extract (mg) |
| --- | --- | --- | --- | --- |
| Sample 1 | 231.46 | 277.42 | 281.48 | 33.21 |
|  | 238.33 | 285.54 |  |  |
| Sample 2 | 947.00 | 1123.05 | 1125.14 | 132.77 |
|  | 950.55 | 1127.24 |  |  |
| Sample 3 | 1669.61 | 1977.04 | 1978.30 | 233.44 |
|  | 1671.75 | 1979.56 |  |  |
| Sample 4 | 1592.89 | 1886.36 | 1888.90 | 222.89 |
|  | 1597.18 | 1891.44 |  |  |
| Sample 5 | 954.93 | 1132.42 | 1129.63 | 199.94 |
|  | 950.22 | 1126.85 |  |  |
| Sample 6 | 818.98 | 971.76 | 972.00 | 114.70 |
|  | 819.39 | 972.24 |  |  |

TABLE 4

L-theanine content of tea extracts produced using six different extraction methods, as determined by quantitative HPLC analysis.

| Sample ID | AUC (mAUCs) | L-theanine concentration/ run (µg/ml) | Average L-theanine concentration (µg/ml) | Total L-theanine in extract (mg) |
| --- | --- | --- | --- | --- |
| Sample 1 | 135.32 | 92.21 | 96.21 | 11.35 |
|  | 145.68 | 100.22 |  |  |
| Sample 2 | 289.49 | 211.46 | 219.69 | 25.92 |
|  | 310.75 | 227.91 |  |  |
| Sample 3 | 514.32 | 385.38 | 386.51 | 45.61 |
|  | 517.24 | 387.64 |  |  |
| Sample 4 | 455.19 | 339.64 | 337.62 | 39.84 |
|  | 449.96 | 335.60 |  |  |
| Sample 5 | 289.44 | 211.42 | 210.90 | 37.33 |
|  | 288.09 | 210.38 |  |  |
| Sample 6 | 263.59 | 191.43 | 197.77 | 23.34 |
|  | 279.99 | 204.12 |  |  |

Tea extracts produced using the multistage pressure extraction methods (i.e., Samples 2-5) had substantially higher caffeine and L-theanine concentrations than a sample produced using a steeping method (Sample 1). The tea extracts produced using the multistage pressure extraction methods likewise had higher caffeine and L-theanine concentrations than a sample produced using a single stage pressure extraction method with a continuous pressure extract stage and no soak stages. Likewise, the total caffeine and L-theanine levels in the tea liquors produced using the multistage pressure extraction methods were substantially higher than those produced for the same amounts of tea material using the steeping method or the single stage pressure extraction method. Tea extract produced using a multistage pressure extraction method having a longer soak stage duration (Sample 3) contained the highest concentrations of caffeine and L-theanine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tea extraction method comprising:
    grinding a tea material to produce a ground tea material comprising a reduced tea material particle size;
    placing an amount of the ground tea material into a tea material receiver having a tea material receiver outlet to produce a bed of tea material;
    performing a multistage pressure extraction process comprising:
    performing a first extraction stage to produce a saturated bed of tea material;
    subjecting the saturated bed of tea material to a first soak stage having a first soak stage duration to produce a first soaked bed of tea material;
    performing a second extraction stage of the first soaked bed of tea material to produce a first extracted bed of tea material;
    subjecting the first extracted bed of tea material to a second soak stage having a second soak stage duration to produce a second soaked bed of tea material; and
    performing a third extraction stage of the second soaked bed of tea material;
    wherein the first extraction stage comprises forcing a first volume of water into the bed of tea material at a first extraction stage pressure of between about 2 bar and about 5 bar for a first extraction stage duration configured to substantially wet the bed of tea material without displacing a tea liquor from the tea material receiver outlet;
    wherein the second extraction stage and the third extraction stage each comprise forcing a volume of water into the bed of tea material at a pressure of between about 2 bar and about 5 bar; and
    wherein a total contact time between the bed of tea material and water used to produce the tea liquor during the multistage extraction process is less than about 60 seconds.

2. The method of claim 1, wherein the tea material comprises one of a plurality of tea material types, and wherein a water temperature is selected in response to one of the plurality of tea material types.

3. The method of claim 1, wherein the first soak stage duration is within a range of about 5 seconds to about 20 seconds.

4. The method of claim 1, wherein the first soak stage duration with within a range of about 10 to about 15 seconds.

5. The method of claim 1, wherein the tea liquor has a refractometric dry substance measurement of greater than about 1.0° Bx.

6. The method of claim 1, wherein the reduced tea material particle size is selected in response to the tea material type.

7. The method of claim 1, wherein grinding the tea material increases a refractometric dry substance measurement of the tea liquor as compared to performing the method with an unground tea material.

8. A method of producing a tea liquor, the method comprising:
    placing an amount of a ground tea material into a tea material receiver to produce a bed of tea material;
    compressing the tea material into the tea material receiver to produce a compressed bed of tea material;
    performing a plurality of extraction stages, wherein each of the plurality of extraction stage comprises forcing a volume of water having a water temperature into the compressed bed of tea material at an extraction stage pressure of between about 2 bar and about 5 bar for an extraction stage duration;
    performing a soak stage, wherein the soak stage follows an extraction stage and wherein the soak stage has a soak stage duration;
    collecting a volume of tea liquor produced during one or more of the plurality of extraction stages;
    wherein a total contact time between the bed of tea material and water used to produce the volume of tea liquor during the multistage extraction process is less than about 60 seconds, and
    wherein the volume of tea liquor has a refractometric dry substance measurement of between about 1.0° Bx and about 2.5° Bx.

9. The method of claim 8, wherein the method comprises a plurality of soak stages.

* * * * *